united States Patent Office 3,833,564
Patented Sept. 3, 1974

3,833,564
NOVEL ESTERS AND THEIR PREPARATION
Jacques Martel, 15 Rue Douvillez, 93 Bondy, France, and Jean Buendia, 32 Avenue Foch, 94 Fontenay-sous-Bois, France
No Drawing. Continuation of abandoned application Ser. No. 9,081, Feb. 5, 1970. This application Aug. 17, 1972, Ser. No. 281,429
Claims priority, application France, Feb. 7, 1969, 6902885; Jan. 7, 1970, 7000401
Int. Cl. C07d 5/16
U.S. Cl. 260—240 R                     7 Claims

ABSTRACT OF THE DISCLOSURE

Racemates of 5-benzyl-3-furyl-methyl esters of cis-3,3-dimethyl - 2-(2'-$R_1$-$R2'$-$R_2$-vinyl)-cyclopropane-1-carboxylic acids or their 1R,2S or 1S,2R isomers of the formula

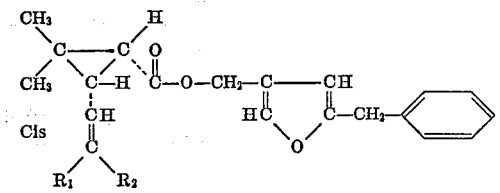

wherein $R_1$ is selected from the group consisting of alkyl of 1 to 6 carbon atoms, aryl and phenylalkyl of 7 to 9 carbon atoms and $R_2$ is selected from the group consisting of alkyl of 1 to 6 carbon atoms, aryl, phenylalkyl of 7 to 9 carbon atoms and alkoxycarbonyl and $R_1$ and $R_2$ taken together with the carbon atom to which they are attached form a carbon homocyclic of 3 to 7 carbon atoms which may be saturated or unsaturated or substituted or not which possess utility in agriculture and in the home as insecticides and their preparation.

This is a continuation of Ser. No. 9,081, filed Feb. 5, 1970, now abandoned.

STATE OF THE ART

French Pat. No. 1,503,260 describes 5-benzyl-3-furyl-methyl chrysanthemate and pyrethrate but up to now, only the esters of d-trans chrysanthemic acid (1R,2R), dl-trans chrysanthemic acid and d-trans seq. trans pyrethric acid (1R,2R) and the ester of a mixture of dl-cis trans chrysanthemic acids have been prepared and studied. These esters in toxicity tests by contact with flies have a very important lethal effect superior to natural pyrethrins. For example, the 5-benzyl-3-furyl-methyl ester of d-trans chrysanthemic acid (1R,2R) possesses a lethal activity against flies 55 times that of natural pyrethrins. On the contrary, these esters of chrysanthemic acid series do not possess a good knock-down effect and they are inferior to natural pyrethrins.

OBJECTS OF THE INVENTION

It is an object of the invention to provide the novel 5-benzyl-3-furyl-methyl esters of cis 3,3-dimethyl-2-(2'-$R_1$-2' - $R_2$ - vinyl)-cyclopropane-1-carboxylic acids of formula I.

It is another object of the invention to provide a novel process for the preparation of the esters of formula I.

It is a further object of the invention to provide novel insecticide compositions and a method of killing insects.

These and other objects and advantages of the invention will become obvious from the following detailed description.

THE INVENTION

The novel compounds of the invention are selected from the group consisting of racemates of 5-benzyl-3-furyl-methyl esters of cis 3,3-dimethyl-2-(2'-$R_1$-2'-$R_2$-vinyl)-cyclopropane-1-carboxylic acids or their 1R,2S or 1S,2R isomers of the formula

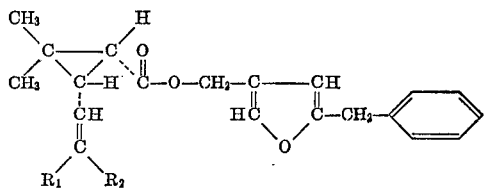

wherein $R_1$ is selected from the group consisting of alkyl of 1 to 6 carbon atoms, aryl and phenylalkyl of 7 to 9 carbon atoms of $R_2$ is selected from the group consisting of alkyl of 1 to 6 carbon atoms, aryl, phenylalkyl of 7 to 9 carbon atoms and alkoxycarbonyl and $R_1$ and $R_2$ taken together with the carbon atom to which they are attached form a carbon homocyclic of 3 to 7 carbon atoms which may be saturated or unsaturated or substituted or not.

In the compounds of formula I, $R_1$ and $R_2$ are preferably lower alkyl such as methyl, ethyl, propyl, isopropyl, butyl, sec.-butyl, pentyl and hexyl; monocyclic aryl such as phenyl; monocyclic aralkyl such as benzyl or phenethyl; alkoxycarbonyl such as methoxycarbonyl; and homocyclic rings such as cyclopropyl, cyclobutyl, cyclopentyl, cyclohexyl, 2,6 - dimethylcyclohexyl and 4,4-dimethylcyclohexyl.

Among the preferred compounds of formula I are 5-benzyl - 3-furyl-methyl ester of cis, 3,3-dimethyl-2S-(2'-methyl-1'-propenyl)-cyclopropane-1R-carboxylic acid or 5-benzyl-3-furyl-methyl ester of cis chrysanthemic acid (1R,2S); 5-benzyl-3-furyl methyl ester of cis 3,3-dimethyl.- 2S-(2'-methoxycarbonyl trans-1'-propenyl)-cyclopropane-1R-carboxylic acid or 5-benzyl-3-furyl-methyl ester of cis seq. trans pyrethric acid (1R,2S); 5-benzyl-3-furyl-methyl ester of cis 3,3-dimethyl-2S-(2'-ethyl-1'-butenyl)-cyclopropane - 1R-carboxylic acid; and 5-benzyl-3-furyl-methyl ester of cis 3,3-dimethyl-2S-cyclopentylidenemethyl-cyclopropane-1R-carboxylic acid.

The 5-benzyl-3-furyl-methyl esters of formula I possess interesting insecticidal properties which make them useful in domestic and agricultural fields for combatting insects. This result is particularly unexpected in view of the fact that cis allethrolone esters are reputed to have a weaker activity than the corresponding trans derivatives [Crombie et al., Progres dans la Chimie des Substances Organiques Naturelles, Vol. 19, pp. 153–4, 1961 Ed.].

The 5-benzyl-3-furyl-methyl ester of cis chrysanthemic acid (1R,2S) has a lethal activity against flies about 11.5 times that of natural pyrethrins. It is unexpected that the compound has a knock-down effect analogous to natural pyrethrins and superior to the 5-benzyl-3-furyl-methyl ester of d-trans chrysanthemic acid (1R,2R). It possesses simultaneously a particularly remarkable high lethal effect and an excellent known-down effect.

The 5-benzyl-3-furyl-methyl ester of 1-cis pyrethric acid (1R,2S) has a $LD_{50}$ and $KD_{50}$ (KD—Knock-Down) superior to that of natural pyrethrins and comparable to that of the 5-benzyl-3-furyl-methyl ester of d-trans seq. trans pyrethric acid (1R,2R). The 5-benzyl-3-furyl-methyl ester of cis 3,3-dimethyl-2S-cyclopentylidenemethyl-cyclopropane-1R-carboxylic acid possesses a lethal activity against house flies equal to that of the 5-benzyl-3-furyl-methyl ester of d-trans-chrysanthemic acid (1R,2R) and a knock-down effect on the same order as that of allethrolone ester of d-trans-chrysanthemic acid (1R,2R).

The novel process of the invention for the preparation of esters of formula I comprises reacting an acid of the formula

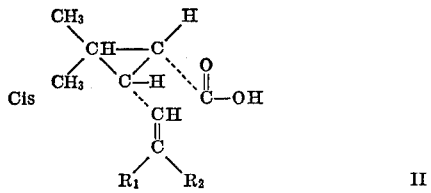

II wherein $R_1$ and $R_2$ have the above definition or a functional derivative of the acid, said acid being racemic or of the 1R,2S or 1S,2R configuration with 5-benzyl-3-furyl methanol or a functional derivative thereof to obtain the corresponding ester.

In a preferred mode of the process of the invention, the acid chloride of the acid of formula II is reacted with 5-benzyl-3-furyl-methanol in the presence of a tertiary base such as pyridine or triethylamine in an organic solvent such as benzene or toluene. The acid chloride can be prepared by reacting the free acid of formula II with thionyl chloride in an organic solvent such as petroleum ether or by reacting oxalyl chloride in the presence of a tertiary base with an alkaline salt of the said acid of formula II in an organic solvent such as benzene. The esterification can also be effected with a functional derivative of the free acid of formula V such as its anhydride or a mixed anhydride.

It is also possible to prepare the compounds of formula I by the transesterification of a lower alkyl ester of the acid of formula II with 5-benzyl-3-furyl-methanol. The said lower alkyl esters are preferably alkyl esters of 1 to 4 carbon atoms and the transesterification is effected in the presence of a basic agent such as an alkali metal or alkali metal alcoholate. The said lower alkyl esters may be made by classical methods by reacting the acid of formula II with an excess of the corresponding alcohol in the presence of an acid catalyst. The esters of formula I can be prepared by reacting the acid chloride of the acid of formula II with an alkali metal derivative of 5-benzyl-3-furyl methanol.

The novel insecticidal compositions of the invention have as the active ingredient at least one ester of formula I and may optionally contain one or more other insecticide agents. The compositions may be in the form of powders, granules, suspensions, emulsions, solutions, aerosol solutions, combustible bands or other classical preparations used for this type of compound. The compositions generally contain besides the active principle a carrier and/or a nonionic surface-active agent to obtain a uniform dispersion of the substances making up the mixture. The carrier may be a liquid such as water, alcohol, hydrocarbons or other organic solvents or mineral, animal or vegetable oils; or a powder such as talc, clay, silica or diatomaceous earth.

To enhance the insecticidal activity of the compounds of formula I, the compositions can also contain classical synergists such as 1-(2,5,8-trioxadodecyl)-2-propyl-4,5-methylenedioxy-benzene (or piperonyl butoxide), N-(2-ethyl-heptyl) - bicyclo - (2,2,1)-5-heptene-2,3-dicarboximide, etc.

An example of a useful insecticidal composition is an emulsifiable concentrate containing by weight 1.5% of the 5-benzyl-3-furyl-methyl ester of d-cis chrysanthemic acid (1R,2S), 15% of the butoxide of piperonyl, 5% of Tween 80, 78.4% of xylene and 0.1% of Topanol A (2,4-dimethyl-6-tert.-butyl-phenol). Other compounds of formula I can be used in the emulsifiable concentrates such as 5-benzyl-3-furyl-methyl ester of cis 3,3-dimethyl-2S-(2'-ethyl-1'-butenyl) - cyclopropane - 1R - carboxylic acid. The insecticidal compositions contain preferably 0.2 to 90% by weight of the active ingredient.

The novel insecticidal method of the invention comprises contacting insects with a lethal amount of at least one compound of formula I.

The acids of formula II can be prepared by the method described in French Pat. No. 1,580,474 by condensation in the presence of a basic agent of the internal hemiacylal of racemic or 1R,2S or 1S,2R of cis 3,3-dimethyl-2-formyl-cyclopropane-1-carboxylic acid with a phosphonic salt of the formula

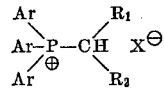

wherein $R_1$ and $R_2$ have the above definitions, Ar is an aryl which may be substituted and X is chlorine, bromine or iodine.

In the following examples there are described several preferred embodiments to illustrate the invention. However, it should be understood that the invention is not intended to be limited to the specific embodiments.

EXAMPLE I 5-benzyl - 3 - furylmethyl ester of cis 3,3-dimethyl-2S-(2'-methyl - 1' - propenyl)-cyclopropane - 1R - carboxylic acid Step A: Cis 3,3-dimethyl - 2S - (2'-methyl-1'-propenyl)-cyclopropane - 1R - carboxylic acid chloride.—8.99 gm. of cis 3,3 - dimethyl - 2S - (2' - methyl - 1' - propenyl)-cyclopropane - 1R - carboxylic acid which was prepared by the method of Campbell et al. [Journ. Sci. Food Agr., 1952, vol. 3, p. 189] and had a melting point of 42° C. and a specific rotation $[\alpha]_D^{20} = +40.8°$ (ethanol) was introduced under a nitrogen atmosphere into 90 cc. of petroleum ether (boiling point=35–70° C.) and then 12.5 gm. of thionyl chloride were added thereto dropwise. The reaction mixture was stirred for 2 hours at room temperature and then the solvent and excess thionyl chloride were eliminated by distillation under reduced pressure. The residue was rectified under a greater vacuum to obtain cis 3,3 - dimethyl - 2S - (2' - methyl - 1' - propenyl)cyclopropane - 1R - carboxylic acid chloride having a boiling point of 60° C. at 0.9 mm. Hg.

As far as is known, this compound is not described in the literature.

Step B: 5-benzyl - 3 - furylmethyl ester of cis 3,3-dimethyl - 2S - (2' - methyl - 1' - propenyl)cyclopropane-1R - carboxylic acid.—2.05 gm. of cis 3,3-dimethyl-2S-(2'-methyl - 1' - propenyl)cyclopropane - 1R - carboxylic acid chloride were introduced under a nitrogen atmosphere into a mixture of 5 cc. of benzene and 2 cc. of pyridine and a mixture of 2.07 gm. of 5-benzyl - 3 - furyl-methanol (produced by process of French Pat. No. 1,503,260) and 10 cc. of benzene was added dropwise to the reaction mixture. The resulting mixture was stirred for 15 hours at room temperature and was then filtered to remove the precipitate formed. The organic filtrate was washed successively with 2N aqueous hydrochloric acid, a saturated aqueous solution of sodium chloride, a saturated aqueous solution of sodium bicarbonate and then with a saturated aqueous solution of sodium chloride. The aqueous wash waters were extracted with ethyl ether and the ether extracts were added to the principal organic phase. The combined organic phase was dried and concentrated to dryness under reduced pressure. The residue was dissolved in benzene and the resulting benzene solution was passed through an alumina column and was concentrated to dryness to obtain 3.153 gm. of 5-benzyl - 3 - furylmethyl ester of cis 3,3 - dimethyl - 2S - (2'-methyl - 1' - propenyl)cyclopropane-1R-carboxylic acid having a melting point of 45° C. (not sharp) and a specific rotation of $[\alpha]_D^{20} = +20°$ (c.=1.4% in methanol).

U.V. spectrum (ethanol):
Max. 258 nm.:
$$E_{1 cm.}^{1\%} = 10.8$$
Max. 264 nm.:
$$E_{1 cm.}^{1\%} = 7.5$$
Max. 268 nm.:
$$E_{1 cm.}^{1\%} = 6.0$$
Max. 301 nm.:
$$E_{1 cm.}^{1\%} = 1.7$$
Max. 310–311 nm.:
$$E_{1 cm.}^{1\%} = 1.7$$

N.M.R. spectrum (deutero chloroform).
The compound had the following characteristics: peaks at 70–73 Hz. (H of 2 methyls in the 3-position); 99–104 Hz. (H of 2 methyls in the side chain); 236 Hz. (H of —CH$_2$— of the benzyl); 294 Hz. (H of —CH$_2$— of —COO—CH$_2$-furyl); 362 Hz. (H in 4-position of furyl); 317–319 Hz. (ethylenic H); 436 Hz. (phenyl H) and 440 Hz. (H in 2-position of furyl).

Analysis. $C_{22}H_{26}O_3$; molecular weight=338.43. Calculated (percent): C, 78.07; H, 7.74. Found (percent): C, 78.0; H, 7.9.

As far as is known, this compound is not described in the literature.

EXAMPLE II 5-benzyl-3-furylmethyl ester of cis 3,3-dimethyl-2S-(2'-methoxycarbonyl trans-1'-propenyl)-cyclopropane-1R-carboxylic acid Step A: Cis 3,3-dimethyl - 2S - (2'-methoxycarbonyl trans-1'-propenyl)cyclopropane - 1R - carboxylic acid.—14.2 gm. of cis 3,3-dimethyl-2S-(2'-methoxycarbonyl trans-1'-propenyl)cyclopropane-1R-carboxylic acid having a melting piont of 70° C. and a specific rotation $[\alpha]_D^{20} = +11.5°$ (c.=1.2% in $CCl_4$) [described in French Pat. No. 1,580,474] were introduced under a nitrogen atmosphere into 142 cc. of petroleum ether (B.P.=35–70° C.) and 15.8 gm. of thionyl chloride were added dropwise thereto. The reaction mixture was stirred at room temperature for 2 hours and the solvent and excess thionyl chloride were eliminated by distillation under reduced pressure. The residue was rectified at a greater pressure to obtain cis 3,3-dimethyl-2S-(2'-methoxycarbonyl trans-1'-propenyl)cyclopropane - 1R - carboxylic acid chloride having a boiling point of 116° C. at 1 mm. Hg and a specific rotation $[\alpha]_D^{20} = -39°$ (c.=1.8% in $CCl_4$).

Step B: 5-benzyl-3-furylmethyl ester of cis 3,3-dimethyl-2S-(2'-methoxycarbonyl trans - 1' - propenyl)cyclopropane-1R-carboxylic acid.—0.852 gm. of cis 3,3-dimethyl-2S-(2'-methoxycarbonyl trans-1'-propenyl)cyclopropane-1R-carboxylic acid chloride were introduced under a nitrogen atmosphere into a mixture of 10 cc. of benzene and 1 cc. of pyridine and then a mixture of 0.700 gm. of 5-benzyl-3-furyl-methanol and 5 cc. of benzene was added thereto dropwise. The reaction mixture was stirred at room temperature for 15 hours and was then filtered to remove the precipitate formed. The organic filtrate was washed successively with 2N aqueous hydrochloric acid, a saturated aqueous solution of sodium chloride, a saturated aqueous solution of sodium bicarbonate and with a saturated aqueous solution of sodium chloride and was dried and concentrated to dryness. The residue was purified by chromatography over alumina with elution with benzene to obtain 1.098 gm. of 5-benzyl-3-furyl methyl ester of cis 3,3-dimethyl-2S-(2'-methoxycarbonyl trans-1'-propenyl)cyclopropane - 1R - carboxylic acid having a specific rotation $[\alpha]_D^{20} = -19.6°$ (c.=0.89% in ethanol).

U.V. spectrum (ethanol):
Max. 223 nm.:
$$E_{1 cm.}^{1\%} = 550$$
Inflexion towards 242 nm.:
$$E_{1 cm.}^{1\%} = 371$$

N.M.R. spectrum (deuterochloroform).
The compound had the following characteristics: peaks at 74–78 Hz. (H of 2 methyls in the 3-position); 113–115.5 Hz. (H of methyl in the side chain); 223.5 Hz. (H of methyl of methoxycarbonyl radical in the side chain); 235 Hz. (H of —CH$_2$— of benzyl); 295 Hz. (H of CH$_2$ of —COO—CH$_2$-furyl); 362 Hz. (H in 4-position of furyl); 429.5 Hz. (ethylenic H); 435.5 Hz. (phenyl H); and 440 Hz. (H in 2-position of furyl).

Analysis: $C_{23}H_{26}O_5$; molecular weight=382.44. Calculated (percent): C, 72.23; H, 6.85. Found (percent): C, 71.9; H, 6.9.

As far as is known, this compound is not described in the literature.

EXAMPLE III 5-benzyl-3-furyl-methyl ester of cis 3,3-dimethyl-2S-(2'-ethyl-1'-butenyl)-cyclopropane - 1R - carboxylic acid Step A: Cis 3,3-dimethyl-2S-(2'-ethyl-1'-butenyl)-cyclopropane - 1R - carboxylic acid.—18.45 gm. of triphenyl 3 - pentyl-phosphonium iodide were introduced into 60 cc. of dimethoxyethane and after the addition at 20° C. of 60 cc. of an 1.7 M hexane solution of butyl lithium, the mixture was stirred for 15 minutes. A solution of 2.84 gm. of the internal hemiacylal of 3,3-dimethyl-2S-formyl-cyclopropane-1R-carboxylic acid (described in French Pat. No. 1,580,474) in 20 cc. of dimethoxyethane was added to the reaction mixture which was stirred for 3 hours at reflux and then 1 hour at room temperature. Excess of the ylide was destroyed by the addition of a few drops of ethanol and the dimethoxyethane was eliminated by distillation under reduced pressure. Water was added thereto and the insolubles formed were removed by filtration. The aqueous solution was washed with methylene chloride and was then acidified by the addition of concentrated hydrochloric acid. The acid aqueous phase was extracted with ether and the ether phase was dried and concentrated to dryness by distillation. The residue was purified by chromatography over silica gel with elution with a mixture of cyclohexane-ethyl acetate-acetic acid (50–50–0.1) to obtain 2.54 gm. of cis 3,3-dimethyl-2S-(2'-ethyl-1'-butenyl)-cyclopropane-1R-carboxylic acid having a refractive index $n_D^{24} = 1.4740$ and a specific rotation $[\alpha]_D^{20} = +32°$ (c.=0.68% in ethanol).

Analysis: $C_{12}H_{20}O_2$: molecular weight=196.28. Calculated (percent): C, 73.42; H, 10.27. Found (percent): C, 73.5; H, 10.2.

U.V. spectrum (ethanol): Inflexion towards 199 nm., $\epsilon = 11,750$.

Step B: Cis 3,3-dimethyl-2S-(2'-ethyl-1'-butenyl)cyclopropane-1R-carboxylic acid chloride.—1.96 gm. of cis 3,3-dimethyl-2S-(2'-ethyl-1'-butenyl)cyclopropane - 1R - carboxylic acid were added to 19.6 cc. of petroleum ether (B.P.=35–70° C.) and then 1.31 gm. of thionyl chloride was added thereto dropwise. The reaction mixture was stirred for 2 hours at room temperature and excess thionyl chloride and the solvent were eliminated by distillation under reduced pressure to obtain cis 3,3-dimethyl-2S-(2'-ethyl-1'-butenyl)-cyclopropane-1R-carboxylic acid chloride.

As far as is known, this compound is not described in the literature.

Step C: 5 - benzyl - 3 - furylmethyl ester of cis 3,3-dimethyl - 2S - 2'-ethyl 1'-butenyl)cyclopropane-1R-carboxylic acid.—The product produced in step B was added as is to 5 cc. of benzene and 1 cc. of pyridine and a solution of 2.07 gm. of 5-benzyl-3-furyl-methanol in 5 cc. of benzene was added thereto dropwise. After stirring for 15 hours at room temperature, the reaction mixture was poured into aqueous 2N hydrochloric acid and after stirring, the organic phase was decanted off. The organic phase was washed successively with aqueous 2N hydrochloric acid, an aqueous solution of sodium bicarbonate and an aqueous saturated sodium chloride solution. The aqueous phase was extracted with ethyl ether and the organic phases were combined, dried and concentrated to dryness by distillation under reduced pressure. The residue was purified by chromatography over silica gel with elution with benzene containing 1‰ of triethylamine to obtain 3.03 gm. of the 5-benzyl-3-furylmethyl ester of cis 3,3 - dimethyl - 2S - (2'-ethyl-1'-butenyl)-cyclopropane-1R-carboxylic acid having a specific rotation $[\alpha]_D^{20}=$ +17° (c.=0.2% in ethanol).

Analysis: $C_{24}H_{30}O_3$; molecular weight=366.51. Calculated (percent): C, 78.65; H, 8.25. Found (percent): C, 78.6; H, 8.4.

U.V. spectrum (ethanol):
Inflexion towards 215 nm.:

$$E_{1cm.}^{1\%}=569$$

Inflexion towards 252 nm.:

$$E_{1cm.}^{1\%}=12$$

Max. at 257 nm.:

$$E_{1cm.}^{1\%}=9.2$$

Inflexion towards 260 nm.:

$$E_{1cm.}^{1\%}=7.6$$

Max. at 262–263 nm.:

$$E_{1cm.}^{1\%}=6.6$$

Max. at 267 nm.:

$$E_{1cm.}^{1\%}=5.3$$

As far as is known, this compound is not described in the literature.

EXAMPLE IV 5-benzyl-3-furylmethylester of cis 3,3-dimethyl-2S-cyclopentylidenemethyl-cyclopropane-1R-carboxylic acid Step A: Cis 3,3-dimethyl 2S-cyclopentylidene methyl cyclopropane - 1R - carboxylic acid.—16.44 gm. of triphenylcyclopentylphosphonium bromide and then 53.5 cc. of an 1.7 M hexane solution of butyllithium were added under a nitrogen atmosphere to 80 cc. of dimethoxyethane and the solution was stirred for 15 minutes at room temperature. A solution of 2.85 gm. of the internal hemiacylal of cis 3,3-dimethyl-2S-formyl-cyclopropane-1R-carboxylic acid in 20 cc. of dimethoxyethane was introduced into the reaction mixture and the mixture was stirred at reflux for 4 hours and then was cooled. The dimethoxy ethane was eliminated by distillation under reduced pressure and the residue was added to water. The aqueous phase was washed with ethyl ether and was acidified by addition of an aqueous solution of concentrated hydrochloric acid. The acidic aqueous phase was extracted with ether and the ether solution was washed with a saturated aqueous solution of sodium chloride, was dried and concentrated to dryness by distillation under reduced pressure. The residue was purified by chromotography over silica gel and elution with a mixture of cyclohexane-ethyl acetate-acetic acid (50–50–.01) to obtain 2.8 gm. of cis 3,3-dimethyl-2S-cyclopentylidenemethyl - cyclopropane-1R-carboxylic acid having a specific rotation $[\alpha]_D^{20}=+93.5°$ (c.=0.64% in ethanol).

Analysis: $C_{12}H_{18}O_2$; molecular weight=194.26. Calculated (percent): C, 74.19; H, 9.34. Found (percent): C, 74.0; H, 9.1.

U.V. spectrum (ethanol): Max. at 213 nm., $\epsilon=10,700$.

Step B: Potassium salt of cis 3,3-dimethyl-2S-cyclopentyl - idenemethyl cyclopropane-1R-carboxylic acid.— 1.943 gm. of cis 3,3-dimethyl-2S-cyclopentylidenemethyl-cyclopropane-1R-carboxylic acid was added under an inert atmosphere to 5 cc. of methanol and then a normal solution of methanolic potassium hydroxide was added dropwise to the mixture until the first appearance of the pink color of phenolphthalein. The methanol was eliminated by distillation under reduced pressure and benzene was added thereto and removed by distillation under reduced pressure. This operation was repeated twice more to remove the last traces of methanol and to obtain the potassium salt of cis 3,3-dimethyl-2S-cyclopentylidinemethyl-cyclopropane-1R-carboxylic acid.

As far as is known, this compound is not described in the literature.

Step C: Cis 3,3 - dimethyl-2S-cyclopentylidenemethyl-cyclopropane-1R-carboxylic acid.—The compound obtained in Step B was added as is under an inert atmosphere to 10 cc. of benzene and 0.5 cc. of pyridine and then a solution of 2.54 gm. of oxalyl chloride in 5 cc. of benzene were added thereto. The mixture was stirred for 1 hour at room temperature and the solvent was removed by distillation under reduced pressure. Benzene was added to the residue and after stirring, the insoluble matter was removed by filtration. The benzene filtrate was concentrated to dryness to obtain cis 3,3-dimethyl-2S-cyclopentylidenemethyl - cyclopropane-1R-carboxylic acid chloride.

As far as is known, this compound is not described in the literature.

Step D: 5-benzyl-3-furylmethyl ester of cis 3,3-dimethyl - 2S - cyclopentylidenemethyl - cyclopropane - 1R - carboxylic acid.—The product produced in Step C was introduced as is into a mixture of 10 cc. of benzene and 2 cc. of pyridine under an inert atmosphere and then a solution of 2.07 gm. of 5-benzyl-3-furyl-methanol in 5 cc. of benzene was added dropwise thereto at a temperature of +5° C. The reaction mixture was stirred for 15 hours at room temperature and the reaction mixture was added to an aqueous 2N hydrochloric acid solution. The organic phase was separated by decanting and then was washed successively with water, with aqueous sodium bicarbonate and then with water. The aqueous phases were extracted with ethyl ether and the combined organic phases were dried and concentrated under reduced pressure. The residue was purified by chromatography over silica gel and elution with benzene containing 1‰ of triethylamine to obtain 1.965 gm. of 5-benzyl-3-furyl-methyl ester of cis 3,3-dimethyl - 2S - cyclopentylidenemethyl-cyclopropane-1R-carboxylic acid having a specific rotation $$[\alpha]_D^{20}=+41.5°$$

(c.=1.2% in ethanol).

Analysis: $C_{24}H_{28}O_3$; molecular weight=364.46. Calculated (percent): C, 79.09; H, 7.74. Found (percent): C, 79.2; H, 7.9.

U.V. spectrum (ethanol):
Inflexion towards 251 nm.:

$$E_{1cm.}^{1\%}=19$$

Inflexion towards 261 nm.:

$$E_{1cm.}^{1\%}=14$$

Inflexion towards 263 nm.:

$$E_{1cm.}^{1\%}=12$$

Max. towards 267:

$$E_{1cm.}^{1\%}=8.7$$

As far as is known, this compound is not described in the literature.

Various modifications of the process and products of the invention may be made without departing from the spirit or scope thereof and it is to be understood that the

We claim:

1. A cis ester selected from the group consisting of the 1R,2S isomers, 1S,2R isomers and mixture of said isomers of 5-benzyl-3-furylmethyl esters of cis 3,3-dimethyl-3-(2'-$R_1$-2'-$R_2$-vinyl)cyclopropane - 1 - carboxylic acids of the formula

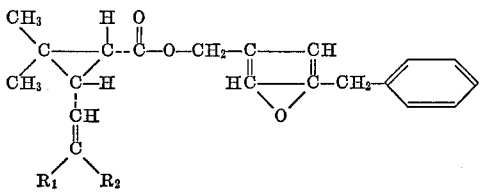

wherein $R_1$ is selected from the group consisting of alkyl of 1 to 6 carbon atoms, phenyl and phenylalkyl of 7 to 9 carbon atoms and $R_2$ is selected from the group consisting of alkyl of 1 to 6 carbon atoms, phenyl, phenylalkyl of 7 to 9 carbon atoms and lower alkoxycarbonyl and $R_1$ and $R_2$ taken together with the carbon atom to which they are attached form a carbon homocyclic of 3 to 7 carbon atoms which may be saturated and optionally substituted with lower alkyl.

2. The cis esters of claim 1 having 1R,2S configuration and $R_2$ is methyl and $R_1$ is selected from the group consisting of methyl and methoxycarbonyl.

3. The compounds of claim 1 wherein $R_1$ and $R_2$ are not methyl at the same time, and $R_2$ is not *lower* alkoxycarbonyl.

4. A compound of claim 1 which is the 5-benzyl-3-furylmethyl ester of cis 3,3-dimethyl-2S-(2'-methyl-1'-propenyl)-cyclopropane-1R-carboxylic acid.

5. A compound of claim 1 which is the 5-benzyl-3-furylmethyl ester of cis 3,3-dimethyl-2S(2'-methoxycarbonyl trans-1'-propenyl)-cyclopropane - 1R - carboxylic acid.

6. A compound of claim 1 which is the 5-benzyl-3-furylmethyl ester of cis 3,3-dimethyl - 2S - (2'-ethyl-1'-butenyl)-cyclopropane-1R-carboxylic acid.

7. A compound of claim 1 which is the 5-benzyl-3-furylmethyl ester of cis 3,3-dimethyl-2S-cyclopentylidene methyl-cyclopropane-1R-carboxylic acid.

References Cited

UNITED STATES PATENTS 3,465,007  9/1969  Elliott  260—347.4

FOREIGN PATENTS 1,503,260  10/1967  France  260—347.4

OTHER REFERENCES

Elliott: Chemistry and Industry, pp. 776–781 (June 14, 1969).

JOHN D. RANDOLPH, Primary Examiner

U.S. Cl. X.R.

424—285; 260—514 H